(12) United States Patent
Poisner et al.

(10) Patent No.: US 7,069,367 B2
(45) Date of Patent: Jun. 27, 2006

(54) METHOD AND APPARATUS FOR AVOIDING RACE CONDITION WITH EDGE-TRIGGERED INTERRUPTS

(75) Inventors: David I. Poisner, Folsom, CA (US); Leslie E. Cline, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 09/752,042

(22) Filed: Dec. 29, 2000

(65) Prior Publication Data

US 2002/0087774 A1 Jul. 4, 2002

(51) Int. Cl.
*G06F 13/24* (2006.01)

(52) U.S. Cl. ...................................... 710/260; 710/261

(58) Field of Classification Search ................ 710/260, 710/261, 262, 263, 264, 265, 266, 267, 268, 710/269
See application file for complete search history.

(56) References Cited

U.S. PATENT DOCUMENTS

| | | | |
|---|---|---|---|
| 4,851,987 A | | 7/1989 | Day |
| 5,101,497 A | | 3/1992 | Culley et al. |
| 5,619,706 A | * | 4/1997 | Young ......................... 710/268 |
| 5,765,003 A | | 6/1998 | MacDonald et al. |
| 5,913,058 A | * | 6/1999 | Bonola .......................... 713/2 |
| 6,029,223 A | * | 2/2000 | Klein .......................... 710/266 |
| 6,339,808 B1 | * | 1/2002 | Hewitt et al. ............... 710/260 |
| 6,470,408 B1 | * | 10/2002 | Morrison et al. ........... 710/268 |

FOREIGN PATENT DOCUMENTS

| | | |
|---|---|---|
| EP | 0 545 581 A2 | 6/1993 |
| EP | 0 645 690 A1 | 3/1995 |
| EP | 0 666 528 A1 | 8/1995 |
| EP | 0 676 686 A2 | 10/1995 |

* cited by examiner

*Primary Examiner*—Tim Vo
(74) *Attorney, Agent, or Firm*—Blakely, Sokoloff, Taylor & Zafman LLP

(57) ABSTRACT

An embodiment of a system for avoiding race conditions when using edge-triggered interrupts includes a processor that asserts an interrupt pending signal in response to the receipt of an edge-triggered interrupt. A power management device receives the interrupt pending signal. If the processor is in a low power state when it asserts the interrupt pending signal, then the power management device causes the processor to enter a high power state to allow the processor to service the pending interrupt.

12 Claims, 2 Drawing Sheets

METHOD AND APPARATUS FOR AVOIDING RACE CONDITION WITH EDGE-TRIGGERED INTERRUPTS

FIELD OF THE INVENTION

The present invention pertains to the field of computer systems. More particularly, this invention pertains to the field of avoiding race conditions when using edge-triggered interrupts.

BACKGROUND OF THE INVENTION

Many of today's microprocessors (referred to as "processors" herein) support a protocol in which the computer system interrupt controller is split between the processor and one or more external interrupt controllers. The portion included in the processor is typically referred to as a "local" interrupt controller and the portions maintained in external devices are typically referred to as "input/output" interrupt controllers. These interrupt controllers may support both level-triggered and edge-triggered interrupt signaling. In addition, some external devices may be capable of delivering edge-triggered or level-triggered interrupt indications to the processor's local interrupt controller without any intervening external input/output interrupt controller.

When a level-triggered interrupt signal is delivered from the input/output interrupt controller to the local interrupt controller, the interrupt remains pending in the input/output interrupt controller until an explicit acknowledgement is received from the processor. However, when edge-triggered interrupt signaling is used, the input/output interrupt controller does not need to "remember" that the interrupt is pending because with edge-triggered interrupt signaling the processor does not acknowledge the interrupt.

Edge-triggered interrupt signaling has some advantages over level-triggered interrupts. The primary advantage is that the processor can avoid the acknowledge cycles and status reads that are required with level-triggered interrupts, thus improving overall system performance.

Edge-triggered interrupts cause a problem, however, in the area of power management. In particular, if an edge-triggered interrupt is delivered from the input/output interrupt controller to the local interrupt controller at about the same time that the processor is entering a low-power state, the interrupt will not be serviced (because the processor is not currently executing instructions due to the low power state) and the processor will remain in the low power state because the system's power management logic has no knowledge that an interrupt is pending (the input/output interrupt controller does not "remember" the pending edge-triggered interrupts). Thus, the interrupt remains pending and unserviced until the power management logic causes the processor to enter a high power state due to some other system event. This latency that results from edge-triggered interrupts arriving at the processor at about the same time the processor is entering a low power state results in lower overall system performance and lost interrupts that may result in functional failures.

A separate problem occurs when a level-triggered interrupt is directly delivered by a peripheral to the processor without any visibility to the input/output interrupt controller, or if another input/output interrupt controller is used that does not have a connection to the power management logic. As with the edge-triggered case described above, the power management logic has no mechanism to detect the pending interrupt in the CPU. The processor may remain in a low power state for too long, resulting in lower overall system performance, lost interrupts, and functional failures.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
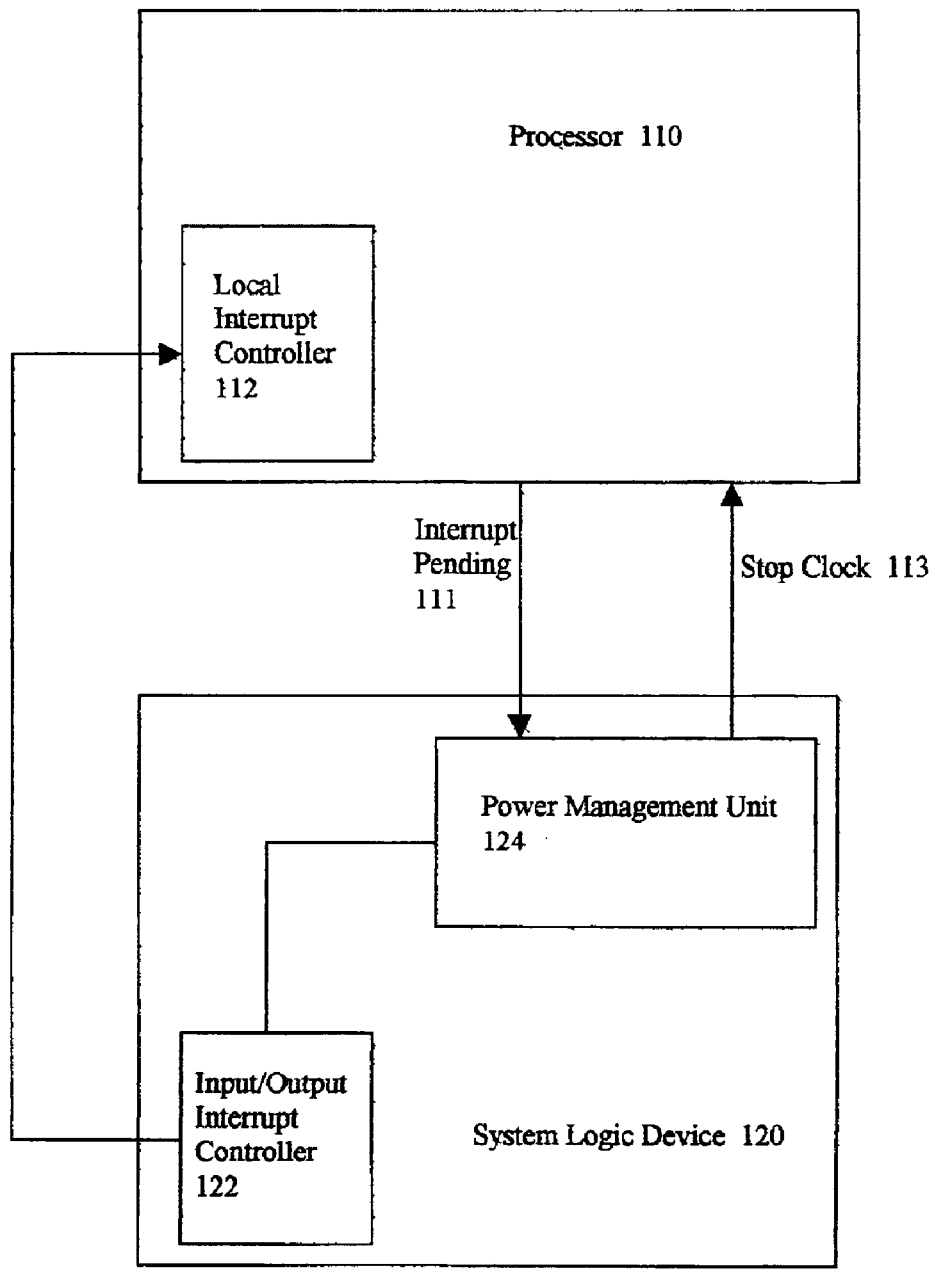
FIG. 1 is a block diagram of one embodiment of a system including an interrupt pending signal delivered by a processor to a power management unit.

FIG. 1 is a block diagram of one embodiment of a system 100 for avoiding race conditions when using edge-triggered interrupts. The system 100 includes a processor 110. The processor includes a local interrupt controller 112. The system 100 also includes a system logic device 120 that includes a power management unit 124 and an input/output interrupt controller 122. Other embodiments are possible that include other devices that can directly indicate interrupts to the local interrupt controller 112. These devices may include a peripheral device or another input/output interrupt controller.

The input/output interrupt controller 122 asserts a variety of interrupts to the local interrupt controller 112. Interrupts may be asserted for a wide range of reasons. Some of these interrupts may be edge-triggered and some may be level-triggered. As interrupts are asserted by the input/output interrupt controller 122, the power management unit 124 receives notification of the asserted interrupts.

The power management unit 124 controls whether the processor 110 is in a low power state or a high power state. The power management unit 124 places the processor 110 in a low power state by asserting a stop clock signal 113. Other embodiments are possible using other techniques for controlling power consumption in processors. The processor 110 ceases to execute instructions in response to an assertion of the stop clock signal 113. The power management unit 124 places the processor 110 into a high power state by deasserting the stop clock signal 113, thereby allowing the processor 110 to resume execution of instructions. In addition to asserting the stop clock signal 113, the power management unit may take additional action to reduce power consumption while placing the processor 110 into a low power state including blocking clock signals and reducing voltage levels.

In order to avoid the race condition that can occur when the power management unit 124 places the processor 110 into a low power state before the processor 110 has an opportunity to service an interrupt recently received by the local interrupt controller 112, the processor asserts an interrupt pending signal 111. The interrupt pending signal 111 alerts the power management unit 124 that an interrupt is still pending in the processor 110. In response to the assertion of the interrupt pending signal 111, the power management unit 124 deasserts the stop clock signal 113, thereby allowing the processor 110 to resume executing instructions and to service the pending interrupt. If the power management unit 124 has taken additional action to reduce power consumption while the processor 110 is in the low power state, such as blocking clock signals or reducing voltages, then the power management unit 124 reverses those actions in further response to the assertion of the interrupt pending signal 111.

In embodiments including peripheral devices or another other input/output interrupt controllers that communicate edge-triggered or level-triggered interrupts directly to the processor 110 without delivering a notification of the interrupts to the power management unit 124, the processor 110 asserts the interrupt pending signal 111 to indicate to the power management unit 124 that an interrupt is pending and the system should be brought to a high power state.

In one embodiment, the processor 110 uses a dedicated pin for the interrupt pending signal 111. Other embodiments are possible where the interrupt pending signal is multiplexed on a pin with another signal. For example, the interrupt pending signal may share a pin with a floating point error signal. The processor 110 can use a select bit within the processor 110 to indicate whether an assertion of the interrupt pending/floating point error signal was used to indicate a floating point error or a pending interrupt. The system logic device 120 may likewise use a select bit to indicate whether the assertion of the interrupt pending/floating point error signal was used to indicate a floating point error or a pending interrupt.

Further, although the discussion above describes an interrupt pending signal that has only two states (either asserted or not asserted), other embodiments are possible where more that one state can be communicated over the interrupt pending signal. Also, although the system 100 includes a single signal line for the interrupt pending signal 111, other embodiments are possible using more than one signal line.

The system 100 described above uses an interrupt pending signal 111 delivered from the processor 110 to the power management unit 124. Other embodiments are possible where instead of the processor delivering a signal to the power management unit, the system logic device or other system component may periodically poll the processor to determine whether an interrupt is pending or not.

The system 100 described above includes only one processor 110. However, other embodiments are possible where more than one processor may be included in the system. The pending interrupt indications from the separate processors may be logically combined to form one pending interrupt indication to the power management unit 124 or the power management unit 124 may receive a separate indication from each of the separate processors.

Figure 2:
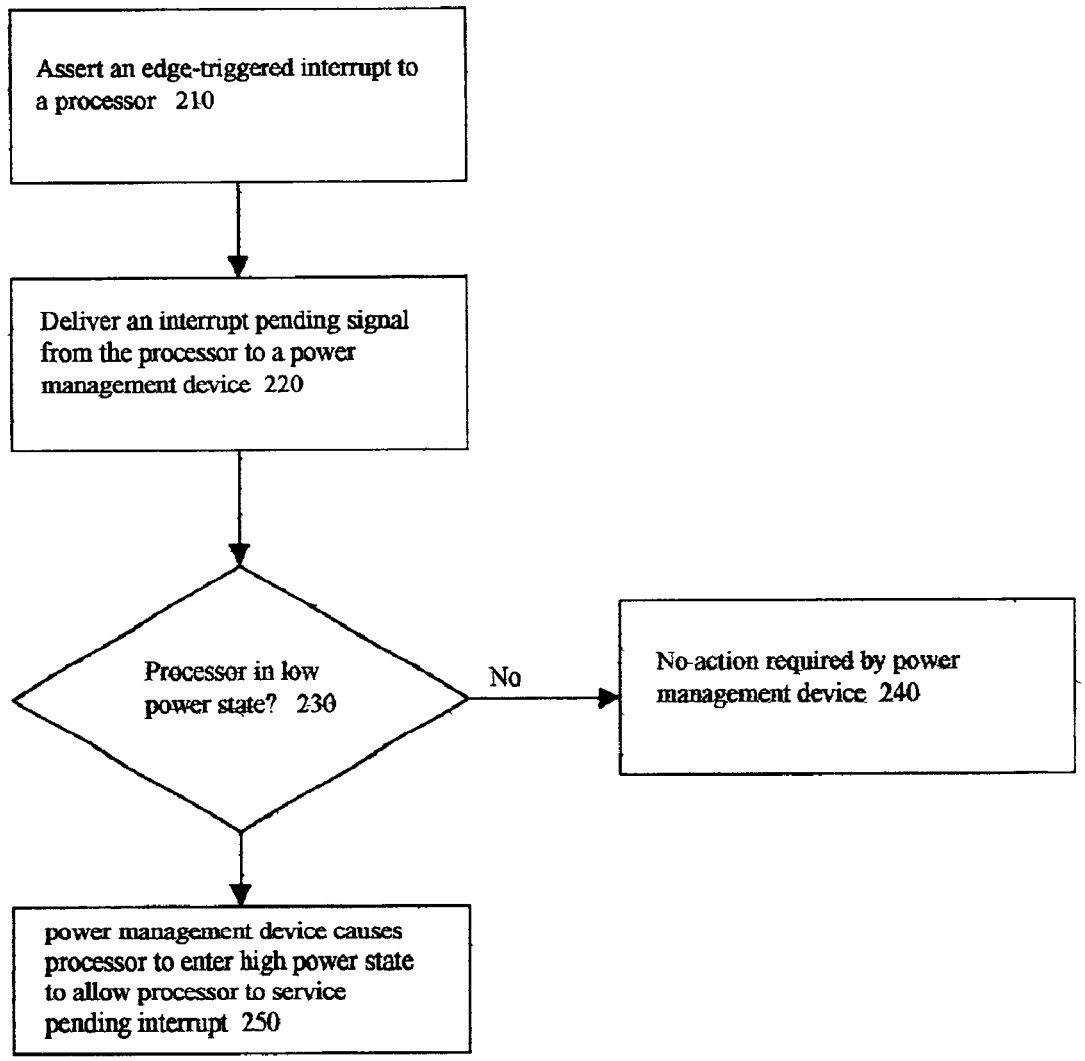
FIG. 2 is a flow diagram of one embodiment of a method for avoiding race conditions when using edge-triggered interrupts.

FIG. 2 is a flow diagram of one embodiment of a method for avoiding race conditions when using edge-triggered interrupts. At block 210, an edge triggered interrupt is asserted to a processor. An interrupt pending signal is asserted from the processor to a power management device at block 220. The interrupt pending signal exposes to the power management device that an interrupt is pending. The power management device would not otherwise have this information. At block 230, a determination is made as to whether the processor is in a low power state or not. If the processor is not in a low power state, then block 240 indicates that normal system operation continues and no action is required by the power management device. If, however, the processor is in a low power state, then at block 250 the power management device causes the processor to enter a high power state to allow the processor to service the pending interrupt.

The method described above in connection with FIG. 2 is not limited to indication of pending edge-triggered interrupts. The interrupt pending indication can be utilized for both edge-triggered and level-triggered interrupts.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. A method, comprising:
    asserting an edge-triggered interrupt signal from an input/output interrupt controller located within a system logic device to a local interrupt controller located within a processor; and
    delivering an interrupt pending signal from the processor to a power management unit located within the system logic device.

2. The method of claim 1, further comprising the system logic device causing the processor to enter a high power state if the processor is in a low power state when the processor delivers the interrupt pending signal to the power management unit.

3. The method of claim 2, wherein delivering an interrupt pending signal includes delivering the interrupt pending signal from the processor to the power management unit over a single signal line coupled between a single processor pin and the system logic device.

4. The method of claim 3, wherein causing the processor to enter a high power state includes the power management unit deasserting a stop clock signal.

5. A method, comprising:
    asserting an edge-triggered interrupt signal from an input/output interrupt controller located within a system logic device to a local interrupt controller located within a processor;
    setting a bit within the processor indicating that an interrupt is pending; and
    polling the processor to determine if an interrupt is pending.

6. The method of claim 5, wherein polling the processor to determine if an interrupt is pending includes polling the processor to determine if an interrupt is pending only if the processor is in a low power state.

7. The method of claim 6, further comprising causing the processor to enter a high power state if the polling of the processor reveals that an interrupt is pending.

8. The method of claim 7, wherein causing the processor to enter a high power state includes deasserting a stop clock signal delivered from a power management unit located within the system logic device to the processor.

9. A system, comprising:
    a processor including a local interrupt controller and an interrupt pending signal output;
    a system logic device including an input/output interrupt controller coupled to the processor, the input/output interrupt controller to deliver an edge-triggered interrupt signal to the processor; and a power management unit located within the system logic device including an interrupt pending signal input coupled to the interrupt pending signal output of the processor, the processor to assert the interrupt pending signal in response to the delivery of the edge-triggered interrupt signal.

10. The system of claim 9, wherein the processor further includes a stop clock signal input, the processor to cease executing instructions in response to an assertion of the stop clock signal by the power management unit.

11. The system of claim 10, wherein the power management unit causes the processor to enter a high power state if the processor is in a low power state when the processor asserts the interrupt pending signal.

12. The system of claim 11, wherein the power management unit causes the processor to enter the high power state by deasserting the stop clock signal.

* * * * *